US010260982B2

(12) United States Patent
Peters et al.

(10) Patent No.: US 10,260,982 B2
(45) Date of Patent: Apr. 16, 2019

(54) PROJECT PLANNING TOOL FOR A GAS ENGINE OR A DUAL-FUEL ENGINE AND METHOD FOR PARAMETERISATION OF THE SAME

(71) Applicant: MAN Diesel & Turbo SE

(72) Inventors: Stefan Peters, Augsburg (DE); Matthias Bachmann, Moettingen (DE); Sebastian Blasberg, Augsburg (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 15/337,727

(22) Filed: Oct. 28, 2016

(65) Prior Publication Data
US 2017/0122831 A1 May 4, 2017

(30) Foreign Application Priority Data
Oct. 31, 2015 (DE) .................. 10 2015 014 188

(51) Int. Cl.
G01L 23/22 (2006.01)
F02D 19/02 (2006.01)
F02D 19/06 (2006.01)
F02D 41/24 (2006.01)
F02B 43/02 (2006.01)
F02D 35/02 (2006.01)
F02D 41/00 (2006.01)
F02D 41/14 (2006.01)

(52) U.S. Cl.
CPC .......... *G01L 23/227* (2013.01); *F02D 19/025* (2013.01); *F02D 19/0623* (2013.01); *F02D 41/2432* (2013.01); *F02B 43/02* (2013.01); *F02D 35/027* (2013.01); *F02D 41/0027* (2013.01); *F02D 2041/1437* (2013.01); *G01L 2023/228* (2013.01); *Y02T 10/32* (2013.01); *Y02T 10/36* (2013.01)

(58) Field of Classification Search
CPC .. F02D 35/027; F02D 41/0027; F02D 19/025; F02D 19/0623; F02D 41/2432; Y02T 10/36; Y02T 10/32; F02B 43/02; G01L 23/227
See application file for complete search history.

(56) References Cited

U.S. PATENT DOCUMENTS 6,178,927 B1   1/2001  Rieck et al.
6,999,866 B2*  2/2006  Noda ................... F02D 35/026
                                                    123/406.29
(Continued)

FOREIGN PATENT DOCUMENTS

DE    19808829    9/1999
DE    19945369    3/2001
(Continued)

*Primary Examiner* — Freddie Kirkland, III
(74) *Attorney, Agent, or Firm* — Cozen O'Connor

(57) ABSTRACT

A system for project planning for an engine for determining an operating behavior of the engine to be expected under defined operating conditions of the engine includes: a plurality of sensors configured to measure respective ones of the defined operating conditions of the engine; and a knocking intensity prediction tool configured to determine the knocking intensity of the engine to be expected under the defined operating conditions of the engine.

6 Claims, 2 Drawing Sheets

(56) References Cited

U.S. PATENT DOCUMENTS

| | | | | |
|---|---|---|---|---|
| 7,243,020 | B2* | 7/2007 | Nakao | G01L 23/225 |
| | | | | 123/406.37 |
| 8,671,911 | B2* | 3/2014 | Moren | F02B 69/04 |
| | | | | 123/305 |
| 9,719,447 | B2* | 8/2017 | Sixel | F02D 41/3005 |
| 9,822,727 | B2* | 11/2017 | Ottikkutti | F02D 41/402 |
| 9,945,303 | B2* | 4/2018 | Bengtsson | F02D 35/021 |
| 9,945,310 | B1* | 4/2018 | McQuillen | F02M 26/14 |
| 2003/0150424 | A1* | 8/2003 | Min | F02P 5/1502 |
| | | | | 123/406.33 |
| 2004/0220720 | A1 | 11/2004 | Noda | |
| 2013/0255628 | A1* | 10/2013 | Moren | F02B 69/04 |
| | | | | 123/406.29 |
| 2016/0084174 | A1* | 3/2016 | Bengtsson | F02D 35/021 |
| | | | | 701/105 |
| 2017/0234245 | A1* | 8/2017 | Bruner | F02D 41/221 |
| | | | | 123/525 |

FOREIGN PATENT DOCUMENTS

| | | |
|---|---|---|
| EP | 1473452 | 11/2004 |
| WO | WO 2013/026949 A1 | 2/2013 |

* cited by examiner

PROJECT PLANNING TOOL FOR A GAS ENGINE OR A DUAL-FUEL ENGINE AND METHOD FOR PARAMETERISATION OF THE SAME

BACKGROUND OF THE INVENTION

1. Field of the Invention

The invention relates to system effecting a project planning tool for a gas engine or a dual-fuel engine. The invention, furthermore, relates to a method for parameterization of a knocking intensity prediction tool of such a project planning tool.

2. Description of the Related Art

A gas engine or a dual-fuel engine operated in gas mode burns gas, in particular natural gas, in a relatively narrow operating window between a so-called misfiring limit and a so called knock limit of the engine. When knocking is detected on the engine, the operating point is either adjusted with the disadvantage of an increase in consumption or the engine power output is reduced. For a gas engine or a dual-fuel engine, which is operated in particular in stationary projects, a reliable prediction of a knocking intensity of the gas engine or of the dual-fuel engine that is expected under defined operating conditions of the gas engine or of the dual-fuel engine is advantageous during project planning in order to be able to furnish customers in advance with reliable information regarding an expected power output of the gas engine or of the dual-fuel engine or an expected consumption of the gas engine or of the dual-fuel engine. To date, no project planning tools for a gas engine or a dual-fuel engine are known with the help of which an expected knocking intensity for defined operating conditions can be predicted.

SUMMARY OF THE INVENTION

Starting out from this, it is an object of the present invention to create a new kind of project planning tool for a gas engine or a dual-fuel engine and a method for parameterization of such project planning tool.

This object may be achieved through a system effecting a project planning tool for a gas engine or a dual-fuel engine that includes a knocking intensity prediction tool that determines the knocking intensity of the gas engine or of the dual-fuel engine in gas mode to be expected under defined operating conditions of the gas engine or of the dual-fuel engine. The project planning tool comprises a knocking intensity prediction tool which determines the knocking intensity of the gas engine or of the dual-fuel engine in gas mode to be expected under defined operating conditions of the gas engine or of the dual-fuel engine, and thereby permits a reliable prediction regarding a fuel consumption or a power output of the engine even at project planning stage, so that the engine can be operated without knocking.

Preferentially, the knocking intensity prediction tool determines the knocking intensity of the gas engine or of the dual-fuel engine in gas mode to be expected dependent on one or more of the operating conditions ambient temperature, ambient pressure, ambient humidity, exhaust gas backpressure, charge air pressure, charge air temperature, ignition timing and methane number of the gas.

A particularly advantageous prediction of the knocking intensity is thereby possible. According to an advantageous further development, the knocking intensity prediction tool comprises a formula or a parameterized characteristic map that is parameterized for the type of the gas engine or of the dual-fuel engine or the series of the gas engine or the dual-fuel engine, which utilizes as input variables ambient temperature and/or ambient pressure and/or ambient humidity and/or exhaust gas backpressure and/or charge air pressure and/or charge air temperature and/or ignition timing and/or methane number of the gas and as output variable outputs the expected knocking intensity of the gas engine or of the dual-fuel engine in gas mode. The formula or the characteristic map is parameterized using measurement results which were determined by measurement on a test engine of the same type or the same series. This configuration makes possible a particularly advantageous prediction of the knocking intensity.

According to another aspect of the invention, a method for the parameterization of a knocking intensity prediction tool of such a project planning tool is provided.

Preferred further developments of the invention are obtained from the following description.

DETAILED DESCRIPTION OF THE PRESENTLY PREFERRED EMBODIMENTS

The present invention relates to a project planning tool for a gas engine or a dual-fuel engine for the gas mode of the same. During the combustion of gas, such as for example natural gas, such engines are operated in a narrow operating window between a so-called misfiring limit and a so-called knock omit. It is advantageous even during project planning of a gas engine or of a dual-fuel engine, which is employed in particular in stationary projects, to determine a knocking intensity of the gas engine or of the dual-fuel engine to be expected under defined operating conditions of the gas engine or of the dual-fuel engine in order to be able to predict the power output that can be provided by the gas engine or dual-fuel engine and/or the fuel consumption of the gas engine or of the dual-fuel engine dependent on this.

Figure 1:
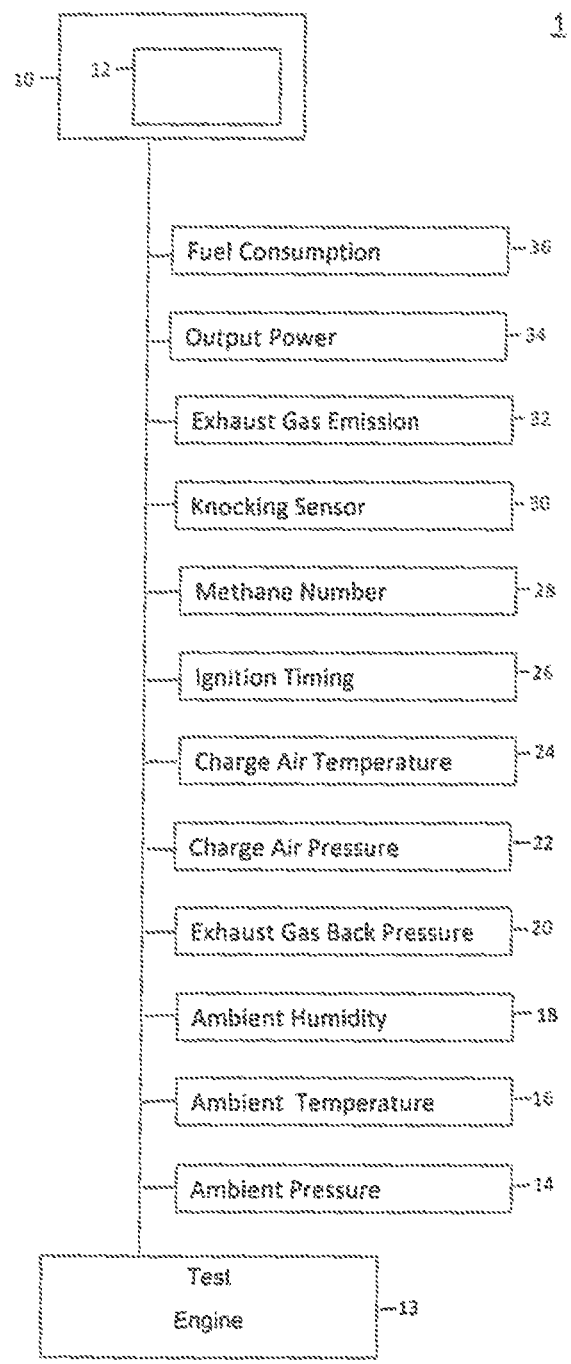
FIG. 1 schematically shows the system that effects the project planning tool according to the present invention.

FIG. 1 schematically illustrates a system 1 effecting a planning tool for a gas engine or a dual-fuel engine according to the invention that comprises a controller 10 configured to provide a knocking intensity prediction tool. The knocking intensity prediction tool of project planning tool according to an embodiment the invention determines the knocking intensity of the gas engine or of the dual-fuel engine to be expected under defined operating conditions of the gas engine or of the dual-fuel engine. Because of this it is possible to predict the power output that can be provided by a gas engine or dual-fuel engine in gas mode and/or the fuel consumption of the engine, namely subject to adhering to the knock limit of the gas engine or of the dual-fuel engine.

The knocking intensity prediction tool 12 of the project planning tool according to the invention determines the knocking intensity of the engine to be expected dependent on the ambient pressure, for example, from an ambient pressure sensor 14, and/or the ambient temperature, for example, from en ambient temperature sensor 16, and/or the ambient humidity, for example, from an ambient humidity sensor 18, and/or exhaust gas backpressure, for example, from an exhaust gas back pressure sensor 20, and/or charge air pressure, for example, from a charge air pressure sensor 22 and/or the charge air temperature, for example, from a charge air temperature sensor 24, and/or the ignition timing, for example, from an ignition timing sensor 26, and/or the methane number of the gas to be combusted, for example, from a methane number sensor 28. This typically takes place by way of a characteristic map or a preferentially polynomial formula.

Here it is preferentially provided that the knocking intensity prediction tool 12 of the project planning tool according to the invention comprises a formula or a parameterized characteristic map parameterized for the type of the gas engine or the type of the dual-fuel engine or for the series of the gas engine or the series of the dual-fuel engine, wherein the formula or the characteristic map as input variables utilizes the ambient temperature and/or the ambient pressure and/or the ambient humidity and/or the exhaust gas backpressure and/or the charge air temperature and/or the charge air pressure and/or the ignition timing and/or the methane number of the gas and as output variable outputs the expected knocking intensity of the gas engine or of the dual-fuel engine in gas mode. The formula or the characteristic map of the knocking intensity prediction tool is preferentially parameterized using measurement results which were determined by measurement on an engine, such as test engine 13, of the same type or series as the projected engine.

Figure 2:
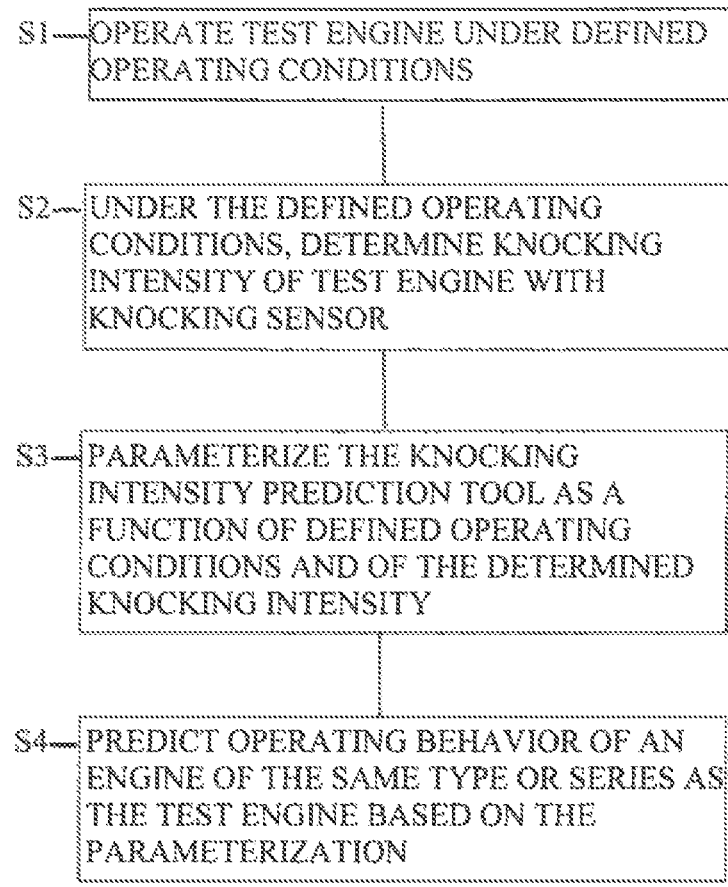
FIG. 2 is a flow chart showing the parameterization of the knocking intensity prediction tool in accordance with the present invention.

As illustrated in the flow chart of FIG. 2, parameterization of the knocking intensity pr diction tool of project planning tool according to the invention can be achieved by operating, in step S1, the test engine 13, which is of the same type or series as the projected engine, under defined operating conditions, namely subject to a defined ambient temperature and/or subject to a defined ambient pressure and/or subject to a defined ambient humidity and/or subject to a defined exhaust gas backpressure and/or subject to a defined charge air temperature and/or subject to a defined charge air pressure and/or subject to a defined ignition timing and/or subject to a defined methane number of the gas to be combusted.

With this operation of the gas engine or of the dual-fuel engine of the same type or same series serving as test engine 13 under the defined operating conditions, the knocking intensity of the test engine which forms is determined at step S2 by measurement using a knocking sensor 30. Following this, at step S3, the knocking intensity prediction tool of project planning tool is parameterized as a function of the defined operating conditions of the test engine and of the knocking intensity of the same determined by measurement in the process, the knocking intensity prediction tool of project planning tool is parameterized, namely by way of algorithms such as for example statistical algorithms. The defined operating conditions under which the test engine 13 is operated for the detection of the knocking intensity by measurement are determined using a statistical test plan in order to determine the operating conditions for the test engine and thus for the parameterization of the knocking intensity prediction tool so that for such operating conditions, which have a major influence on the knocking intensity, preferably many reliable measurement results are available.

While detecting the knocking intensity, a fuel consumption of the gas engine or of the dual-fuel engine and/or an exhaust gas emission of the gas engine or of the dual-fuel engine and/or an output power output of the gas engine or of the dual-fuel engine can be additionally determined by measurement at the same time in order to obtain a correlation between the variables detected by measurement and to utilize these for project planning.

With the help of project planning tools according to the invention, in step S4 reliable predictions regarding the operating behavior of the respective engine can be obtained in particular in gas engines or dual-fuel engines operated in stationary projects, in particular regarding the expected knocking intensity of the gas engine or of the dual-fuel engine and regarding the expected fuel consumption and the engine power output of the gas engine or of the dual-fuel engine that can be made available.

Should it materialize during project planning that under defined operating conditions the knock limit of the gas engine or of the dual-fuel engine is exceeded, the engine adjustment of the gas engine or of the dual-fuel engine to be projected has to be adapted either by reducing the engine power output or by increasing the gas consumption. Accordingly, a gas engine or a dual-fuel engine can be optimally designed even during project planning. Customers can be provided with reliable information regarding the expected operating behavior of the gas engine or of the dual-fuel engine in the field.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the me way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A system for project planning for an engine for determining an operating behavior of the engine to be expected under defined operating conditions of the engine, the system comprising:
   a plurality of sensors configured to measure respective ones of the defined operating conditions of the engine; and
   a knocking intensity prediction tool configured to determine the knocking intensity of the engine to be expected under the defined operating conditions of the engine,
   wherein the knocking intensity prediction tool is configured to determine an expected knocking intensity of the engine dependent on:
   (a) methane number of the gas, and
   (b) one or more selected from the group of operating conditions of: ambient temperature, ambient pressure, ambient humidity, exhaust gas backpressure, charge air pressure, and charge air temperature.

2. The system according to claim 1, wherein the knocking intensity prediction tool uses a formula or a parameterized characteristic map that is parameterized for the type of the engine or the series of the engine, wherein the formula or the parameterized characteristic map utilizes, as input variables, ambient temperature and/or ambient pressure, ambient humidity, exhaust gas backpressure, charge air pressure, charge air temperature, ignition timing and methane number of the gas and outputs, as an output variable, the expected knocking intensity of the engine.

3. The system according to claim 2, wherein the formula or the characteristic map is parameterized using measurement results determined by measurements taken on a test engine of a same type or same series as the engine.

4. A method for parameterization of a knocking intensity prediction tool according to claim 3, the method comprising:
- operating the test engine subject to defined methane number of the gas;
- operating the test engine subject to at least one selected from the group of operating conditions of: defined ambient temperature, defined ambient pressure, defined ambient humidity, defined exhaust gas backpressure, defined charge air pressure, and defined charge air temperature;
- measuring, using a knocking sensor, to determine the knocking intensity of the test engine; and
- parameterizing the knocking intensity prediction tool based on the defined operating conditions and corresponding knocking intensities.

5. The method according to claim 4, wherein the defined operating conditions under which the test engine is operated are determined based on a statistical test plan.

6. The system according to claim 1, wherein the engine is one selected from the group consisting of a gas engine or a dual-fuel engine.

* * * * *